UNITED STATES PATENT OFFICE 2,690,463

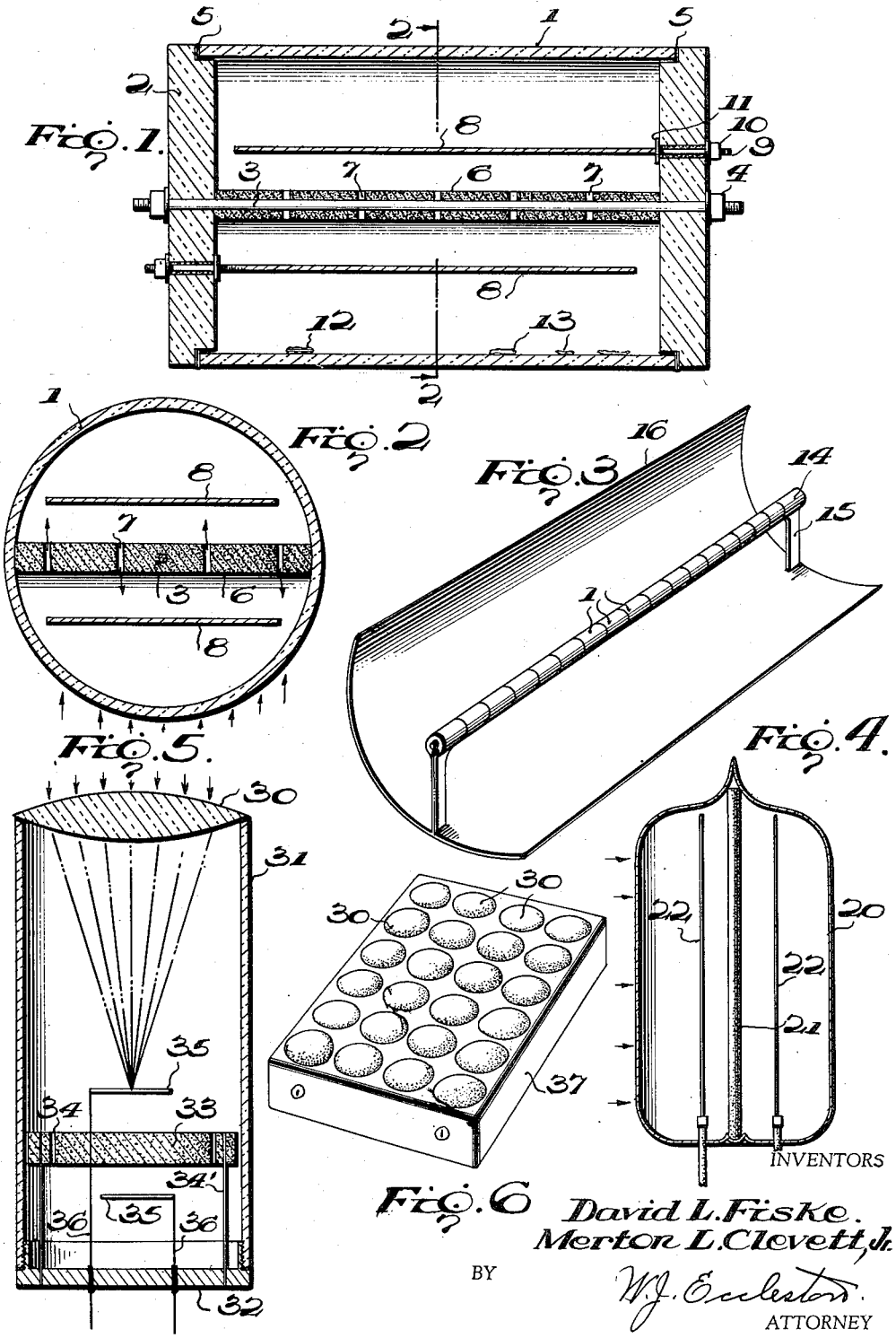

THERMOELECTRIC POWER CELL

Merton L. Clevett, Jr., Jeffersonville, Ind., and
David L. Fiske, Natick, Mass.

Application October 28, 1953, Serial No. 388,927

8 Claims. (Cl. 136—4)

(Granted under Title 35, U. S. Code (1952),
sec. 266)

The invention described herein, if patented, may be manufactured and used by or for the Government for governmental purposes, without the payment to us of any royalty thereon.

This invention relates to a thermoelectric power cell for converting solar heat energy into electric energy, and has for its primary object to provide a simplified construction, the elements of which are capable of mass production.

A further object of the invention resides in the provision of a thermoelectric cell having an envelope which is at least transparent to radiant energy of the wave lengths of the solar or nuclear spectrum, and containing a black target for transforming the radiant energy into heat energy.

Another object of the invention consists in constructing a thermoelectric cell which is designed to produce a greater temperature difference between the "hot" and "cold" junctions than heretofore with a consequently greater electromotive force.

A still further object of the invention consists in providing a thermoelectric power cell in which an easily vaporizable element such as sodium is used in conjunction with plates of graphite.

Other objects and advantages of the invention will be apparent from the following description taken in connection with the accompanying drawings, in which, Figure 1 is a longitudinal sectional view through one form of the thermoelectric power cell forming the subject matter of the present invention;

Figure 2 is a transverse sectional view taken on the line 2—2 of Figure 1;

Figure 3 is a perspective view of a thermoelectric pile composed of a plurality of the cells of Figures 1 and 2, placed end to end for cooperation with a reflector or heat concentrating means;

Figure 4 is a longitudinal sectional view of a slightly modified form of the cell shown in Figures 1 to 3 inclusive;

Figure 5 is a longitudinal sectional view through a thermoelectric power cell of a somewhat different type and provided with a built-in lens; and, Figure 6 is a perspective view of a thermoelectric pile in which a plurality of the cells of Figure 5 are juxtaposed in a single unit and electrically connected.

More specifically, the numeral 1 designates a cylinder of glass, preferably heat resistant glass such as pyrex, and closed at its opposite ends by plates of steel or other sturdy material 2 which are rigidly clamped to the ends of the cylinder by means of a rod 3 extending through the axis of the cylinder and nuts 4 threaded to the opposite ends of the rod. This cylinder is formed with a relatively high degree of vacuum, and consequently, gaskets 5 are seated between the periphery of the metal discs 2 and the ends of the cylinder 1.

In this form of the invention the cylinder 1 is divided longitudinally into two substantially semi-cylindrical sections and the dividing means comprises a heat baffle 6 which may be formed of asbestos cement or any other suitable material capable of withstanding the operating temperatures necessary for the proper function of these thermoelectric cells. Also, it will be readily understood that some means must be provided for permitting circulation between the two semi-cylindrical compartments, and for this purpose the baffle 6 is provided with a plurality of perforations 7.

One of the elements of the thermocouple employed in the cells of the present invention is a graphite plate 8, which extends substantially throughout the length of the compartment and is secured to the end plate 2 by means of a rod 9 extending through an aperture therein, and a nut 10 and cylinder 11 formed on the inner end of the rod clamped to the end plate 2. As will be noted from viewing Figure 2, the graphite plates span substantially the whole width and length of the semi-cylindrical compartments and thus provide very substantial surfaces for the reception of solar heat radiations, as will appear hereinafter.

The other element of the thermocouple is sodium or other easily vaporizable material, and in Figure 1 a piece of sodium 12 is indicated in the lower compartment of the cell. This piece of sodium is of such size as to provide an adequate content of vaporized sodium when the cell is in use. This sodium is initially placed in a fragile glass capsule and installed in the cell 1 prior to the evacuation of the cell. Thereafter the capsule may be easily shattered by shaking the cell once or twice, thus freeing the metallic sodium so that it may be later vaporized. The shattered remains of the capsule are indicated by the reference numeral 13 in Figure 1.

As indicated in Figure 3, a plurality of the thermoelectric cells 1 are arranged end to end on a frame 14 which is mounted on legs 15 to properly space the series of cells from a parabolic reflector 16, thus when the rays of the sun are reflected from the reflector 16 they will pass through the glass cylinder 1 and impinge on a graphite plate 8 as indicated by the arrows at the bottom of Figure 2. This concentration of heat will gradually raise the temperature within the cell well above 1428° F., which is the temperature at which sodium is evaporable in a vacuum of the degree provided within the cells 1. The sodium after vaporization is allowed to pass back and forth between the semi-cylindrical compartments by reason of the perforations 7 formed within the heat baffle 6, and of course while the sodium is maintained in a gaseous state in both compartments the junction of the graphite and sodium vapor nearest the reflector will be at a higher temperature than the junction of those elements in the compartment remote from the reflector thereby providing the temperature difference necessary to obtain sufficient Seebeck effect to develop maximum electromotive force.

In Figure 4 the structure is substantially identical with that shown in Figures 1 and 2 except that the cell 20 is formed of a single piece of glass somewhat after the manner of an electric bulb, thus eliminating the use of separate end plates, a rod for clamping the end plates to the glass cylinder and the gaskets for providing an adequate cell. This form of the invention, however, is also provided with a heat baffle 21, graphite plates 22 and vaporized sodium or the like, as in Figures 1 and 2.

The modified form of the invention shown in Figure 5 functions in the identical manner as the thermoelectric cell shown in Figures 1, 2 and 3, but in lieu of a parabolic reflector 16, such as shown in Figure 3, a built-in lens is employed in one end of the tube. This lens is indicated by the numeral 30 and may be formed of homogeneous solid material such as glass, or may be a hollow transparent shell lens with a clear liquid center. In either case, the lens is mounted in an airtight manner in the upper end of a cylinder 31 which latter is hermetically sealed at its lower end by a closure disc 32. Here again the evacuated cell is divided into two compartments by a heat baffle 33 formed of asbestos cement or other high temperature refractory material. In this instance, however, the baffle which is provided with perforations 34 extends transversely of the tube and is supported on standards 34'. The graphite plates 35 are spaced on either side of the baffle 33, and supported by means of electric conducting rods 36 extending through the disc 32.

When the thermoelectric power cells of Figure 5 are used they are preferably mounted in a rectangular block 37 with the cells arranged vertically, and the lenses 30 positioned in a single plane to receive the solar rays.

In the operation of either type of thermoelectric power cell the solar rays are concentrated on one of the two compartments of each cell and raise the temperature therein so as to vaporize the metallic sodium and produce the Seebeck effect heretofore referred to, and the perforations within the heat baffle permit the electroconductive gas or vapor to circulate freely throughout the entire cell and produce the electric current in the usual way by reason of the difference in temperature between the "hot" and "cold" junctions in the two compartments.

From the foregoing description taken in connection with the accompanying drawings, it will be apparent to those skilled in the art that we have devised a thermoelectric power cell of rather simple construction, that the cells can be readily combined to receive solar heat and produce a substantial electric current for operating various types of electrical equipment, that it is without moving parts and therefore noiseless, and that a relatively high temperature difference is provided between the "hot" and "cold" junctions by reason of the elements employed in the formation of the thermocouple.

In accordance with the patent statutes, we have described what we now consider to be the preferred form of the invention, but inasmuch as various minor changes may be made in the structural details without departing from the spirit of the invention, it is intended that all such changes be included within the scope of the appended claims.

Having described our invention, we claim:

1. A thermoelectric power cell comprising a transparent vacuum tube, a perforated partition of heat insulating material extending across said tube and dividing the same into two compartments, a thermoelectric couple mounted in the compartments, one of the elements of the couple being easily vaporized, and means for focusing heat on the elements in one compartment.

2. A thermoelectric power cell comprising a transparent vacuum tube, a perforated partition of heat insulating material extending across said tube and dividing the same into two compartments, a thermoelectric couple mounted in the compartments, one of the elements of the couple being sodium and the other graphite, and means for focusing heat on the elements in one compartment.

3. A thermoelectric power cell comprising a transparent vacuum tube, a perforated partition of heat insulating material extending across said tube and dividing the same into two compartments, a thermoelectric couple mounted in the compartments, one of the elements of the couple being sodium and the other being plates of graphite, and means for focusing solar heat on the elements in one of said compartments.

4. A thermoelectric power cell comprising a transparent vacuum tube, a perforated partition of heat insulating material extending along the axis of the tube and dividing the same into semi-cylindrical compartments, a thermoelectric couple mounted in the tube and comprising a graphite plate in each compartment and sodium in at least one of said compartments, and means for focusing heat on the elements in one compartment.

5. A thermoelectric power cell comprising a transparent vacuum tube, a perforated partition of heat insulating material extending along the axis of the tube and dividing the same into semi-cylindrical compartments, a thermoelectric couple mounted in the tube and comprising a graphite plate in each compartment paralleling the partition and sodium in at least one of said compartments, and means for focusing heat on the elements in one compartment to thereby vaporize the sodium.

6. A thermoelectric power cell comprising a transparent vacuum tube, a perforated partition of heat insulating material extending across the tube and dividing the same into two cylindrical compartments, a thermoelectric couple mounted in the tube and comprising a graphite plate in each compartment and sodium in at least one of said compartments, and means for focusing heat on the elements in one compartment.

7. A thermoelectric pile comprising a plurality of thermoelectric power cells arranged side by side, each cell comprising a transparent vacuum tube, a perforated partition of heat insulating material extending across the tube and dividing the same into two compartments, a thermoelectric couple mounted in the compartments of each tube, one of the elements of the couple being easily vaporized, and means for focusing heat on the elements in one compartment of each cell.

8. A thermoelectric pile comprising a plurality of thermoelectric power cells arranged end to end, each cell comprising a transparent vacuum tube, a perforated partition of heat insulating material extending across the tube and dividing the same into two compartments, a thermoelectric couple mounted in the compartments of each tube, one of the elements of the couple being easily vaporized, and a single parabolic reflector for focusing solar heat rays on the elements in one compartment of each cell.

No references cited.